(12) United States Patent
Koike

(10) Patent No.: US 11,567,396 B2
(45) Date of Patent: Jan. 31, 2023

(54) PROJECTION APPARATUS

(71) Applicant: CANON KABUSHIKI KAISHA, Tokyo (JP)

(72) Inventor: Toru Koike, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/551,323

(22) Filed: Dec. 15, 2021

(65) Prior Publication Data

US 2022/0197125 A1    Jun. 23, 2022

(30) Foreign Application Priority Data

Dec. 17, 2020 (JP) .............................. JP2020-209675

(51) Int. Cl.
*G03B 21/26* (2006.01)
*G06F 3/0484* (2022.01)
*G06F 3/0354* (2013.01)

(52) U.S. Cl.
CPC ......... *G03B 21/26* (2013.01); *G06F 3/03545* (2013.01); *G06F 3/0484* (2013.01)

(58) Field of Classification Search
CPC .... G03B 21/26; G03B 2206/00; G03B 17/54; G03B 21/14; G06F 3/03545; G06F 3/0484; G06F 2203/0382; G06F 3/038
See application file for complete search history.

(56) References Cited

U.S. PATENT DOCUMENTS

| | | | |
|---|---|---|---|
| 2013/0300658 A1* | 11/2013 | Endo | G06F 3/03545 345/157 |
| 2015/0199036 A1* | 7/2015 | Akitomo | G06F 3/0412 345/173 |
| 2020/0125213 A1 | 4/2020 | Shiohara | |

FOREIGN PATENT DOCUMENTS

| | | | |
|---|---|---|---|
| JP | 2013-130915 A | | 7/2013 |
| JP | 2013175001 A | * | 9/2013 |

* cited by examiner

*Primary Examiner* — Amit Chatly
(74) *Attorney, Agent, or Firm* — Cowan, Liebowitz & Latman, P.C.

(57) ABSTRACT

A projection apparatus according to the present invention, includes at least one memory and at least one processor which function as: a control unit configured to control to project an image on a projection surface; a detection unit configured to detect an operation performed on the projection surface using a pointer; and a processing unit configured to perform generation and editing of a graphic in response to the operation, wherein the processing unit is able to edit a first graphic formed using a first pointer and a second graphic formed using a second pointer independently of each other.

14 Claims, 12 Drawing Sheets

PROJECTION APPARATUS

BACKGROUND OF THE INVENTION

Field of the Invention

The present invention relates to a projection apparatus.

Description of the Related Art

A projection apparatus is known that generates a graphic and projects it on a projection surface in response to an operation performed on the projection surface using a pointer. Such a projection apparatus projects a figure at a position indicated with a pointer, and projects a line by tracking positions indicated with the pointer. Japanese Patent Application Publication No. 2013-130915 discloses a technique for projecting graphics in separate regions for the respective pointers so that the graphics formed with different pointers are distinguished.

With the conventional technique, however, it is difficult to edit a desired graphic in a region where multiple graphics formed using different pointers gather (overlap one another).

SUMMARY OF THE INVENTION

The present invention provides a technique for facilitating the editing of a graphic using a pointer.

A projection apparatus according to the present invention, includes at least one memory and at least one processor which function as: a control unit configured to control to project an image on a projection surface; a detection unit configured to detect an operation performed on the projection surface using a pointer; and a processing unit configured to perform generation and editing of a graphic in response to the operation, wherein the processing unit is able to edit a first graphic formed using a first pointer and a second graphic formed using a second pointer independently of each other.

Further features of the present invention will become apparent from the following description of exemplary embodiments with reference to the attached drawings.

DESCRIPTION OF THE EMBODIMENTS

First Embodiment

A first embodiment according to the present invention is now described. A projection apparatus (projector) according to the first embodiment generates a graphic and projects it on a projection surface (screen) in response to an operation performed on the projection surface using a pointer. The projection apparatus according to the first embodiment may project a figure at a position indicated with the pointer, and projects a line by tracking positions indicated with the pointer. In the first embodiment, as an example of editing of a graphic formed using a pointer, an example of erasing in response to an operation performed using a pointer is described. The projection apparatus according to the first embodiment can individually erase graphics formed using different pointers (individual erasing). Also, the projection apparatus according to the first embodiment can be switched among multiple erasing methods, such as the individual erasing and a method of collectively erasing multiple graphics formed using different pointers (without distinction) (batch erasing).

Figure 1:
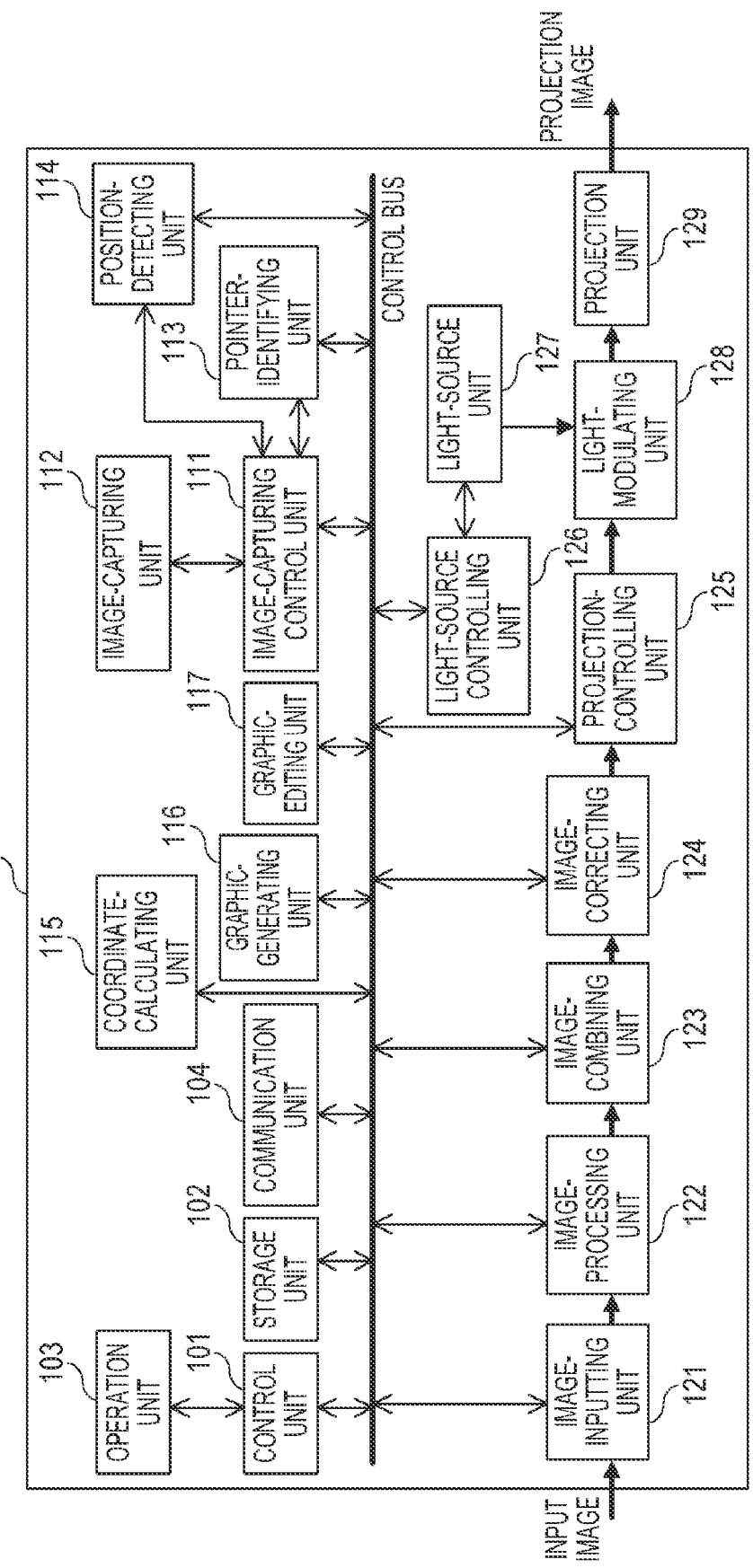
FIG. 1 is a block diagram showing an example of the configuration of a projection apparatus according to a first embodiment.

FIG. 1 is a block diagram showing an example of the configuration of a projection apparatus 100 according to the first embodiment. The projection apparatus 100 combines a graphic formed using a pointer with an obtained image (superimposes the graphic on the obtained image), and projects the combined image on a projection surface (not shown). The obtained image is an image based on image data (image signal) input to the projection apparatus 100 or image data stored in the projection apparatus 100. The obtained image may or may not be an image that has been subjected to certain image processing in the projection apparatus 100. Certain image processing may or may not be performed in the projection apparatus 100 between the combination and projection.

In FIG. 1, thin arrows represent flows of various data used for control, and thick arrows represent flows of image data. In FIG. 1, a control unit 101 may be an arithmetic unit, such as application-specific integrated circuit (ASIC) or a field-programmable gate array (FPGA). Similarly, an image-capturing control unit 111, a pointer-identifying unit 113, a position-detecting unit 114, a coordinate-calculating unit 115, a graphic-generating unit 116, and a graphic-editing unit 117 may be an arithmetic unit, such as an ASIC and FPGA. An image-inputting unit 121, an image-processing unit 122, an image-combining unit 123, an image-correcting unit 124, a projection-controlling unit 125, and a light-source controlling unit 126 may also be an arithmetic unit such as an ASIC and FPGA. These components are configured as hardware or software in the arithmetic unit.

The control unit 101 is connected to each component in the projection apparatus 100 by a control bus, controls each component, and performs various arithmetic processing necessary for the operation of the projection apparatus 100.

A storage unit 102 is a storage apparatus such as a random access memory (RAM), a solid-state drive (SSD), or a hard disk drive (HDD). The storage unit 102 stores various images and various types of information necessary for the operation of the projection apparatus 100. For example, the storage unit 102 stores, for each pointer, a drawing plane (layer) for drawing a graphic formed using the pointer. The storage unit 102 may or may not be detachable from the projection apparatus 100.

An operation unit 103 receives an operation (user operation) performed by a user on the projection apparatus 100. For example, the operation unit 103 includes an operation apparatus, such as buttons and a mouse, and a control circuit thereof. The operation unit 103 transmits an operation performed by the user to the control unit 101, and the control unit 101 controls the components of the projection apparatus 100 according to the transmitted operation. The operation apparatus may or may not be detachable from the projection apparatus 100. The operation apparatus may be an apparatus separate from the projection apparatus 100, such as a remote controller.

A communication unit 104 communicates (transmits and receives data) with an apparatus external to the projection apparatus 100 (external apparatus). For example, the communication unit 104 includes terminals of communication standards, such as a Universal Serial Bus (USB) and a local area network (LAN), and a processing circuit thereof. The communication unit 104 may be capable of wireless communication via a wireless LAN or the like.

The image-capturing control unit 111 controls an image-capturing unit 112. For example, the image-capturing control unit 111 switches ON and OFF of the image-capturing unit 112, and instructs the image-capturing unit 112 to start capturing an image (image-capturing instruction).

The image-capturing unit 112 includes an imaging element, such as an image sensor and an infrared sensor, and captures an image of a region including at least the projection surface. In the first embodiment, a pointer is detected and identified (distinguished) from the captured image (sensor image).

The pointer-identifying unit 113 detects and identifies (distinguishes) a pointer from a sensor image obtained by the image-capturing unit 112. For example, when multiple pointers have different emission patterns and emission wavelengths, the pointer-identifying unit 113 uses the difference in emission pattern and emission wavelength to detect and identify the pointers from the sensor image. In the first embodiment, the pointer-identifying unit 113 detects a region in the sensor image that shows the emission pattern, emission wavelength, or the like of a pointer as the region of this pointer. Instead of detecting a pointer, the pointer-identifying unit 113 may identify a pointer located at a position detected by the position-detecting unit 114. When multiple pointers have different shapes, the pointer-identifying unit 113 may detect and identify the pointers through pattern matching using the shapes of the pointers.

In the first embodiment, the user causes a pointer to emit light when performing an operation using the pointer. Then, as described above, the pointer-identifying unit 113 detects a region of the sensor image that shows the emission pattern, emission wavelength, or the like of the pointer as the region of the pointer. As such, in the first embodiment, when an operation is performed on the projection surface using a pointer, the pointer-identifying unit 113 detects and identifies the pointer. For this reason, the processing of the pointer-identifying unit 113 can be considered as a part of the processing for detecting an operation performed using a pointer. In the first embodiment, the control unit 101 uses the pointer-identifying unit 113, the position-detecting unit 114, and the coordinate-calculating unit 115 to detect an operation performed using a pointer. There is no limitation to the method of detecting an operation performed using a pointer. For example, a pointer may transmit predetermined information during an operation of the pointer, and the communication unit 104 may receive the predetermined information from the pointer. The control unit 101 may determine the presence or absence of an operation performed using the pointer depending on whether the communication unit 104 receives the predetermined information.

The position-detecting unit 114 detects the position of a pointer from a sensor image obtained by the image-capturing unit 112. For example, the position-detecting unit 114 detects the position of a pointer by detecting a region showing the emission pattern or emission wavelength of the pointer, or by image analysis such as pattern matching using the shape of the pointer. When there are multiple pointers, the position of each pointer is detected. The position-detecting unit 114 may detect the position of a pointer by a method different from the image analysis. For example, a sensor such as a pressure sensor or an electrostatic sensor may be provided on the projection surface, and the communication unit 104 may obtain the output value of the sensor. Then, the position-detecting unit 114 may detect the position of the pointer based on the obtained output value.

The coordinate-calculating unit 115 transforms the position detected by the position-detecting unit 114 (the position of the pointer in the sensor image) into coordinates of the position in a projection image (image to be projected on the projection surface, such as the obtained image described above). In order to accurately perform this coordinate transformation, the control unit 101 calibrates the coordinate transformation. To perform calibration, the control unit 101 projects a certain projection image, which includes a pattern at a predetermined position, onto the projection surface from a projection unit 129. Then, the control unit 101 uses the image-capturing unit 112 to obtain a sensor image with the certain projection image projected (displayed), and uses the position-detecting unit 114 to detect the position of the pattern in the sensor image. The control unit 101 then compares the position of the pattern in the sensor image with the position of the pattern in the certain projection image and corrects (calibrates) the parameters (e.g., transformation matrix) of the coordinate transformation.

The graphic-generating unit 116 generates a graphic in response to an operation performed using a pointer. In the first embodiment, the graphic-generating unit 116 draws a graphic on a drawing plane using the position (position of the pointer in the projection image) obtained by the coordinate-calculating unit 115. The graphic-generating unit 116 also generates an on-screen display (OSD) such as a menu.

The graphic-editing unit 117 edits a graphic (a graphic drawn on a drawing plane) according to an operation performed using a pointer. For example, the editing of a graphic includes at least one of erasing, enlargement, reduction, and moving of the graphic. Enlargement and reduction of a graphic can be considered as changing of the size of the graphic.

The image-inputting unit 121 obtains an image (input image; image data) from the outside of the projection apparatus 100. The image-inputting unit 121 includes an image-inputting circuit that is compliant with an image communication standard such as High-Definition Multimedia Interface (HDMI) (registered trademark), DisplayPort (registered trademark), and USB.

The image-processing unit 122 performs image processing (enlargement/reduction, color gamut conversion, brightness correction, etc.) on the input image, and outputs the image after the image processing. The image output from the image-processing unit 122 (image after image processing) is used as the obtained image. The input image may be used as the obtained image without performing image processing by the image-processing unit 122.

The image-combining unit 123 superimposes a drawing plane and an OSD on the image output from the image-processing unit 122 to generate a combined image.

The image-correcting unit 124 corrects the combined image according to the states of the projection apparatus 100 and the projection surface, and outputs the corrected image. For example, the image-correcting unit 124 performs processing such as trapezoidal correction, which corrects the shape of an image that is projected obliquely into a rectangle shape, and picture shifting, which corrects the projection position.

The projection-controlling unit 125 controls a light-modulating unit 128 based on the image (image data) output from the image-correcting unit 124. For example, the projection-controlling unit 125 converts the image data output from the image-correcting unit 124 according to the characteristics of the light-modulating elements (e.g., a liquid crystal element and a mirror) of the light-modulating unit 128, and controls the light-modulating unit 128 according to the converted image data.

The light-source controlling unit 126 controls a light-source unit 127. For example, the light-source controlling unit 126 switches ON and OFF (illuminating/extinguishing) of the light-source unit 127, or changes the emission brightness (emission intensity; emission amount) of the light-source unit 127.

The light-source unit 127 emits light for projecting an image. The light-source unit 127 includes a light source, such as a lamp, a light-emitting diode (LED), or a laser, and optical elements, such as a lens and a mirror. The light-source unit 127 applies light to the light-modulating unit 128. The light-source unit 127 may include multiple light sources of different emission colors (for example, three light sources of a red light source, a green light source, and a blue light source), or may include one light source (for example, a white light source). The light-source unit 127 may include a color wheel for changing (switching) the color of the light emitted from the light source.

The light-modulating unit 128 modulates the light emitted from the light-source unit 127 so that an image based on the image data output from the image-correcting unit 124 is projected on the projection surface. The system of the light-modulating unit 128 may be any of a liquid crystal display (LCD) system, a liquid crystal on silicon (LCOS) system, a digital light processing (DLP) (registered trademark) system, and the like. The light-modulating unit 128 includes a light-modulating panel (e.g., a transmissive liquid crystal panel, a reflective liquid crystal panel, and a digital mirror device (DMD)), a lens, a mirror (including a prism), and the like. The light-modulating unit 128 may include multiple light-modulating panels corresponding to the respective colors (for example, three colors of red, green, and blue), or may include one light-modulating panel.

The projection unit 129 includes a projection lens and outputs the light that is modulated by the light-modulating unit 128 to the outside of the projection apparatus 100. As a result, an image is projected on the projection surface. When a graphic formed using a pointer is generated, the graphic and the obtained image are projected together (simultaneously) on the projection surface.

Figure 2:
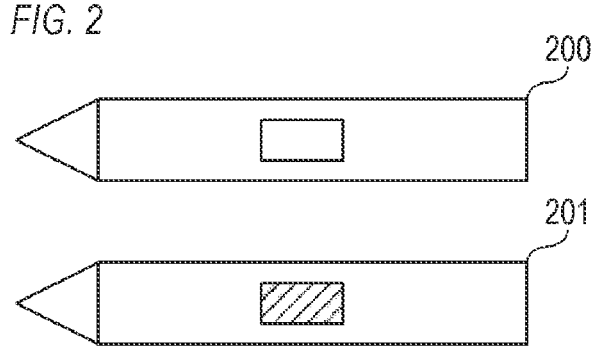
FIG. 2 is a schematic view showing an example of pointers according to the first embodiment.

FIG. 2 is a schematic view showing an example of pointers 200 and 201 according to the first embodiment. The pointer 200 is an operation member (operation body) used by a user to perform an operation on the projection surface (to indicate a position on the projection surface). The pointer 200 includes a light-emitting member (not shown), such as an infrared-emitting diode, at the tip thereof, and an operation performed using the pointer 200 is detected by detecting the light emitted by the light-emitting member. The pointer 201 has a similar configuration as the pointer 200. However, in order for the pointer-identifying unit 113 to detect and distinguish between an operation performed using the pointer 200 and an operation performed using the pointer 201, the pointer 201 (the light-emitting member provided at the tip of the pointer 201) emits light in an emission pattern different from that of the pointer 200.

Figure 3:
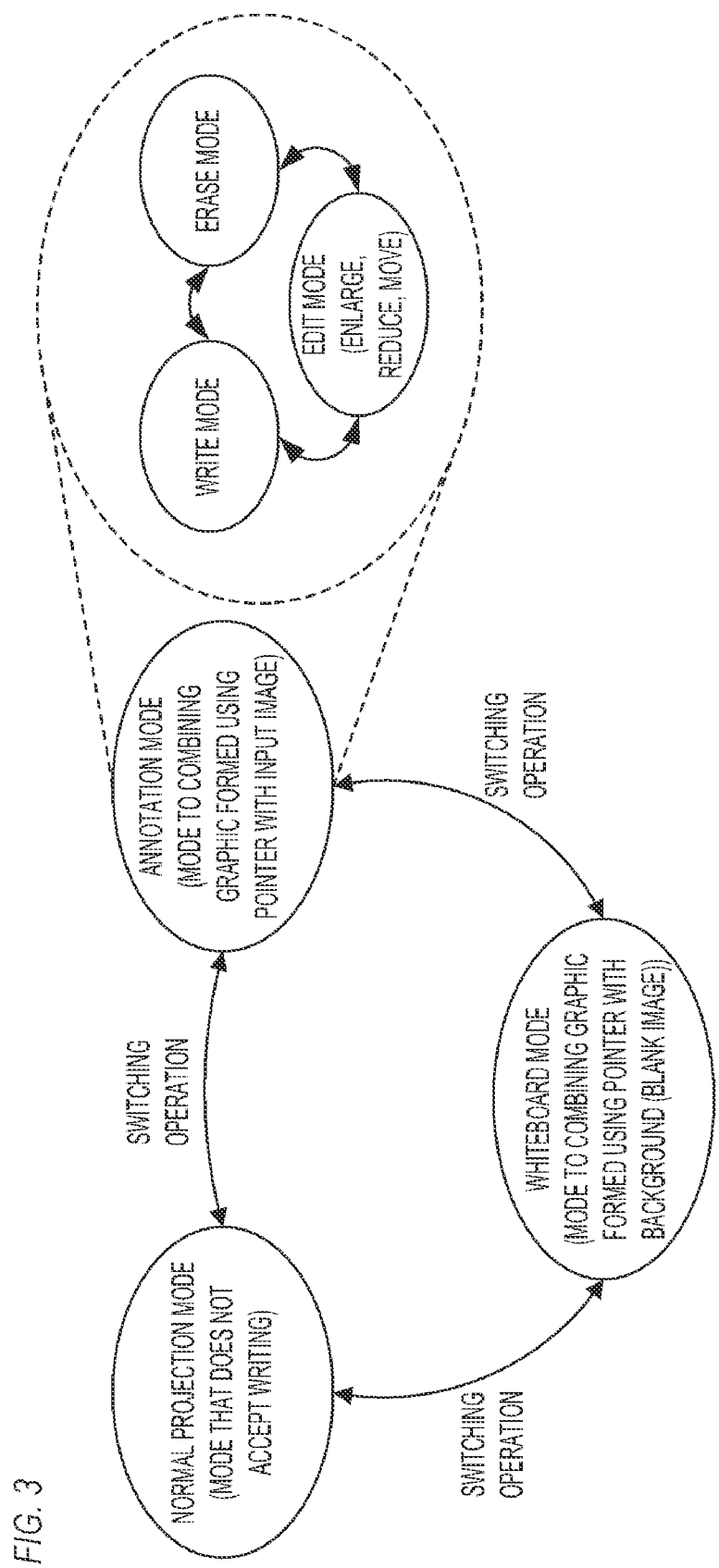
FIG. 3 is a schematic view showing an example of operation modes according to the first embodiment.

FIG. 3 is a schematic view showing an example of operation modes of the projection apparatus 100. For example, the operation modes of the projection apparatus 100 include a normal projection mode, an annotation mode, and a whiteboard mode. The normal projection mode is an operation mode for projecting an input image (obtained image). The annotation mode and the whiteboard mode are operation modes in which graphics can be generated and edited using pointers. The annotation mode is an operation mode in which a graphic is projected as a supplementary element, and the whiteboard mode is an operation mode in which a graphic is projected as the main element (an operation mode in which the projection surface is used as a whiteboard).

The user can switch the operation mode of the projection apparatus 100 (the operation mode set for the projection apparatus 100) between the normal projection mode, the annotation mode, and the whiteboard mode by specifying an operation mode using the operation unit 103. The operation to specify an operation mode (operation to switch the operation mode) is not limited to an operation using the operation unit 103. For example, the operation to specify an operation mode may be an operation in which the user specifies (selects; touches) a button of the menu projected on the projection surface with a pointer.

The switching of the operation mode is now described in more detail. For example, when the normal projection mode is set, the control unit 101 determines whether an operation (instruction) for switching the operation mode of the projection apparatus 100 to the annotation mode or the whiteboard mode is performed by the user. When determining that an operation for switching the operation mode of the projection apparatus 100 to the annotation mode is performed, the control unit 101 switches the operation mode of the projection apparatus 100 to the annotation mode. Similarly, when determining that an operation for switching the operation mode of the projection apparatus 100 to the whiteboard mode is performed, the control unit 101 switches the operation mode of the projection apparatus 100 to the whiteboard mode. When determining that an operation for switching the operation mode of the projection apparatus 100 is not performed, the control unit 101 maintains the normal projection mode as the operation mode of the projection apparatus 100.

When the annotation mode is set, the control unit 101 determines whether an operation (instruction) for switching the operation mode of the projection apparatus 100 to the normal projection mode or the whiteboard mode is performed by the user. When determining that an operation for switching the operation mode of the projection apparatus 100 to the normal projection mode is performed, the control unit 101 switches the operation mode of the projection apparatus 100 to the normal projection mode. Similarly, when determining that an operation for switching the operation mode of the projection apparatus 100 to the whiteboard mode is performed, the control unit 101 switches the operation mode of the projection apparatus 100 to the whiteboard mode. When determining that an operation for switching the operation mode of the projection apparatus 100 is not performed, the control unit 101 maintains the annotation mode as the operation mode of the projection apparatus 100.

When the whiteboard mode is set, the control unit 101 determines whether an operation (instruction) for switching the operation mode of the projection apparatus 100 to the normal projection mode or the annotation mode is performed by the user. When determining that an operation for switching the operation mode of the projection apparatus 100 to the normal projection mode is performed, the control unit 101 switches the operation mode of the projection apparatus 100 to the normal projection mode. Similarly, when determining that an operation for switching the operation mode of the projection apparatus 100 to the annotation mode is performed, the control unit 101 switches the operation mode of the projection apparatus 100 to the annotation mode. When determining that an operation for switching the operation mode of the projection apparatus 100 is not performed, the control unit 101 maintains the whiteboard mode as the operation mode of the projection apparatus 100.

As shown in FIG. 3, the annotation mode includes a write mode, an erase mode, and an edit mode. The write mode is an operation mode to generating and projecting a graphic formed using a pointer (an operation mode that enables writing on the projection surface with a pointer). The erase mode is an operation mode to erasing a graphic projected in the write mode, in response to an operation performed using a pointer. The edit mode is an operation mode to enlarging, reducing, or moving a graphic projected in the write mode, in response to an operation performed using a pointer. The control unit 101 can set the projection apparatus 100 to the write mode, the erase mode, or the edit mode in the same manner as described above. The whiteboard mode may also have a write mode, an erase mode, and an edit mode.

Figure 4:
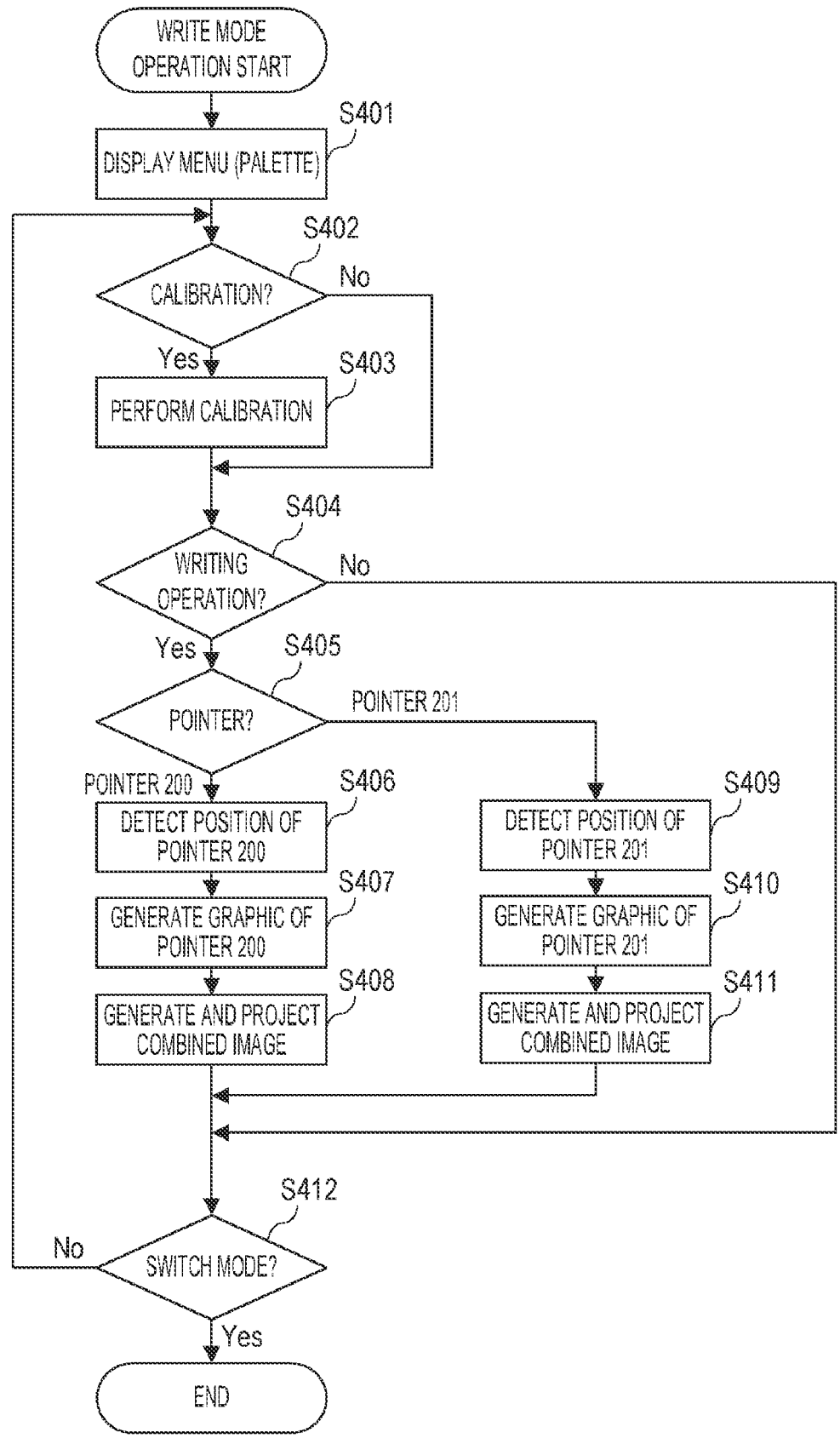
FIG. 4 is a flowchart showing an operation example of a write mode according to the first embodiment.

FIG. 4 is a flowchart showing an operation example of the projection apparatus 100 in a state in which the write mode is set.

At step S401, the control unit 101 combines and projects an input image (obtained image) and an operation menu (palette; user interface image) generated by the graphic-generating unit 116.

At step S402, the control unit 101 determines whether the user has selected a calibration button in the operation menu. If the control unit 101 determines that the calibration button is selected, the process proceeds to step S403. If not, the process proceeds to step S404.

At step S403, the control unit 101 performs calibration of the coordinate-calculating unit 115 (calibration of the coordinate transformation by the coordinate-calculating unit 115).

At step S404, the control unit 101 determines whether an operation (writing operation) is performed using a pointer. In the first embodiment, the control unit 101 determines that a writing operation is performed when the pointer-identifying unit 113 detects the pointer 200 or the pointer 201. If not, the control unit 101 determines that a writing operation is not performed. If the control unit 101 determines that a writing operation is performed, the process proceeds to step S405. If not, the process proceeds to S412.

At step S405, the control unit 101 determines from the identification result of the pointer-identifying unit 113 whether the pointer with which the writing operation is performed is the pointer 200 or the pointer 201. The control unit 101 proceeds to step S406 when determining that the pointer with which the writing operation is performed is the pointer 200, or proceeds to step S409 when determining that the pointer with which the writing operation is performed is the pointer 201.

At step S406, the control unit 101 uses the position-detecting unit 114 and the coordinate-calculating unit 115 to obtain the position of the pointer 200 in the projection image.

Figure 5A:
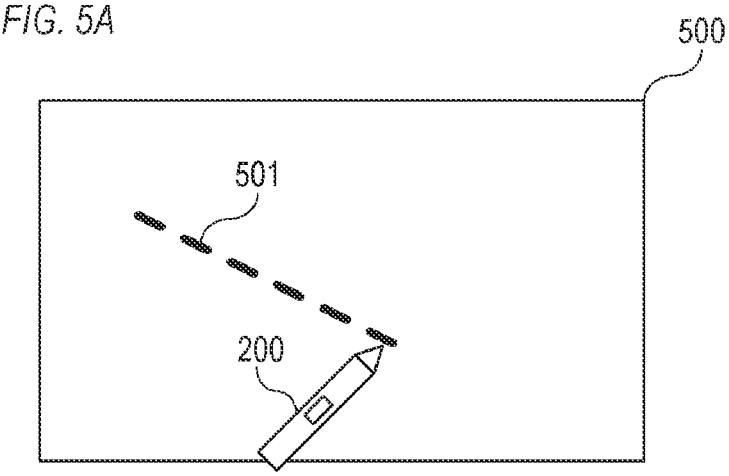
FIGS. 5A to 5C are schematic views showing examples of images according to the first embodiment.

At step S407, the control unit 101 uses the graphic-generating unit 116 to generate a graphic corresponding to the writing operation performed using the pointer 200. FIG. 5A is a schematic view showing a drawing plane 500 on which a graphic formed with the pointer 200 is drawn. In FIG. 5A, a graphic 501 (broken line) is drawn on the drawing plane 500 in response to a writing operation performed using the pointer 200.

At step S408, the control unit 101 uses the image-combining unit 123 to combine the input image (obtained image) with the drawing plane 500 and a drawing plane 510 (FIG. 5B) including a graphic formed using the pointer 201. The control unit 101 projects the combined image onto the projection surface (update of the projection image). The projection of the combined image may involve processing by the image-correcting unit 124, processing by the projection-controlling unit 125, and the like.

At step S409, the control unit 101 uses the position-detecting unit 114 and the coordinate-calculating unit 115 to obtain the position of the pointer 201 in the projection image.

Figure 5B:
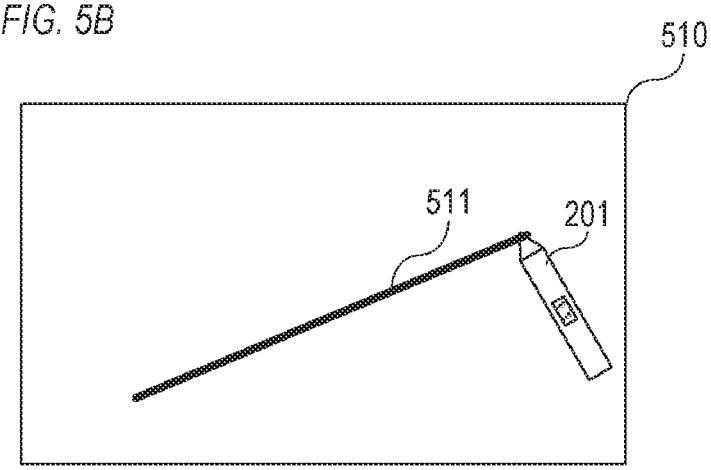

At step S410, the control unit 101 uses the graphic-generating unit 116 to generate a graphic corresponding to the writing operation performed using the pointer 201. FIG. 5B is a schematic view showing the drawing plane 510 on which a graphic formed using the pointer 201 is drawn. In FIG. 5B, a graphic 511 (solid line) is drawn on the drawing plane 510 in response to a writing operation performed using the pointer 201.

Figure 5C:
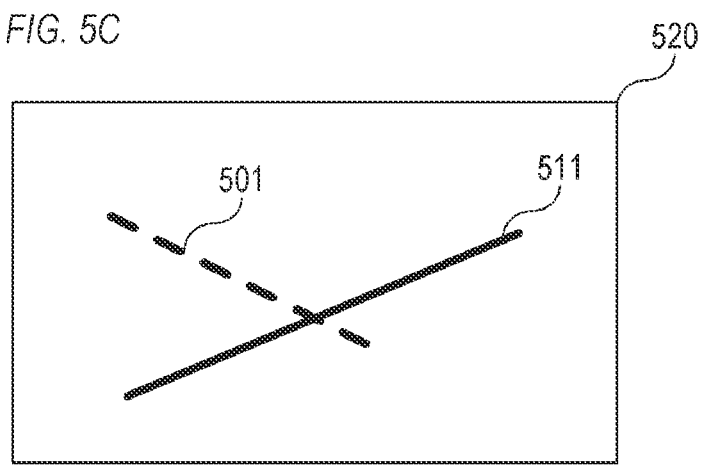

At step S411, the control unit 101 uses the image-combining unit 123 to combine the input image (obtained image) with the drawing plane 510 and the drawing plane 500. The control unit 101 projects the combined image onto the projection surface (update of the projection image). The projection of the combined image may involve processing by the image-correcting unit 124, processing by the projection-controlling unit 125, and the like. FIG. 5C is a schematic view showing a combined image 520 in which the input image is combined with the drawing plane 500 and the drawing plane 510. The graphic 501 formed using the pointer 200 and the graphic 511 formed using the pointer 201 are drawn on the combined image 520.

At step S412, the control unit 101 determines whether an operation for switching the operation mode of the projection apparatus 100 is performed by the user. If the control unit 101 determines that an operation for switching the operation mode of the projection apparatus 100 is performed, the control unit 101 ends the process shown in FIG. 4. If not, the process returns to step S402.

Figure 6:
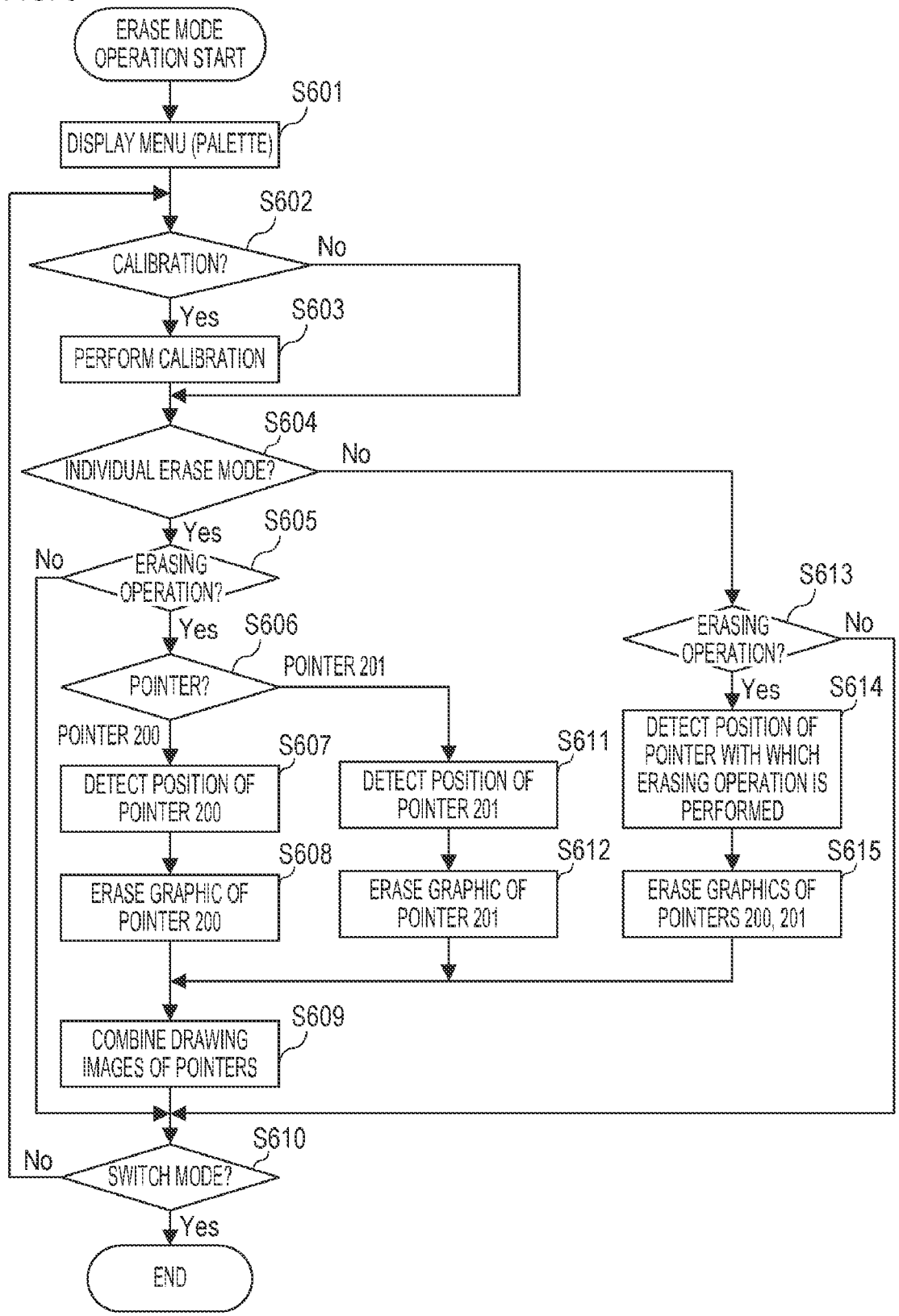
FIG. 6 is a flowchart showing an operation example of an erase mode according to the first embodiment.

FIG. 6 is a flowchart showing an operation example of the projection apparatus 100 in a state in which the erase mode is set.

At step S601, the control unit 101 combines and projects an input image (obtained image) and an operation menu generated by the graphic-generating unit 116.

At step S602, the control unit 101 determines whether the user has selected the calibration button in the operation menu. If the control unit 101 determines that the calibration button is selected, the process proceeds to step S603. If not, the process proceeds to step S604.

At step S603, the control unit 101 performs calibration of the coordinate-calculating unit 115 (calibration of the coordinate transformation by the coordinate-calculating unit 115).

At step S604, the control unit 101 determines whether an individual erase mode is selected by the user in the operation menu. The individual erase mode is an operation mode in which a graphic formed using each pointer is to be individually edited, and, specifically, an operation mode in which a graphic formed using each pointer is individually erased. If the control unit 101 determines that the individual erase mode is selected, the process proceeds to step S605. If not, specifically, if the control unit 101 determines that a batch erase mode is selected, the process proceeds to step S613. The batch erase mode is an operation mode in which multiple graphics formed using different pointers are to be edited collectively (without distinction), and, specifically, an operation mode in which multiple graphics formed using different pointers are erased collectively (without distinction). When the erase mode is not selected in detail in the operation menu, the operation may be switched depending on whether the current erase mode is the individual erase mode or the batch erase mode.

At step S605, the control unit 101 determines whether an operation (erasing operation) is performed using a pointer. In the first embodiment, the control unit 101 determines that an erasing operation is performed when the pointer-identifying unit 113 detects the pointer 200 or the pointer 201. If not, the control unit 101 determines that an erasing operation is not performed. If the control unit 101 determines that an erasing operation is performed, the process proceeds to step S606. If not, the process proceeds to S610.

At step S606, the control unit 101 determines from the identification result of the pointer-identifying unit 113 whether the pointer with which the erasing operation is performed is the pointer 200 or the pointer 201. The control unit 101 proceeds to step S607 when determining that the pointer with which the erasing operation is performed is the pointer 200, or proceeds to step S611 when determining that the pointer with which the erasing operation is performed is the pointer 201.

At step S607, the control unit 101 uses the position-detecting unit 114 and the coordinate-calculating unit 115 to obtain the position of the pointer 200 in the projection image.

At step S608, according to the erasing operation performed using the pointer 200, the control unit 101 erases the graphic formed using the pointer 200. In the first embodiment, the control unit 101 uses the graphic-editing unit 117 to erase the image information at the position of the pointer 200 from the drawing plane of the pointer 200 (update of the drawing plane of the pointer 200).

At step S609, the control unit 101 uses the image-combining unit 123 to combine the input image (obtained image) with the drawing planes (drawing planes updated according to the erasing operation). The control unit 101 projects the combined image onto the projection surface (update of the projection image). The projection of the combined image may involve processing by the image-correcting unit 124, processing by the projection-controlling unit 125, and the like.

At step S610, the control unit 101 determines whether an operation for switching the operation mode of the projection apparatus 100 is performed by the user. If the control unit 101 determines that an operation for switching the operation mode of the projection apparatus 100 is performed, the control unit 101 ends the process shown in FIG. 6. If not, the process returns to step S602.

At step S611, the control unit 101 uses the position-detecting unit 114 and the coordinate-calculating unit 115 to obtain the position of the pointer 201 in the projection image.

At step S612, according to the erasing operation performed using the pointer 201, the control unit 101 erases the graphic formed using the pointer 201. In the first embodiment, the control unit 101 uses the graphic-editing unit 117 to erase the image information at the position of the pointer 201 from the drawing plane of the pointer 201 (update of the drawing plane of the pointer 201).

At step S613, the control unit 101 determines whether an operation (erasing operation) is performed using a pointer, in the same manner as step S605. If the control unit 101 determines that an erasing operation is performed, the process proceeds to step S614. If not, the process proceeds to S610.

At step S614, the control unit 101 uses the position-detecting unit 114 and the coordinate-calculating unit 115 to obtain the position of the pointer (pointer with which the erasing operation is performed) in the projection image.

At step S615, according to the erasing operation performed using the pointer 200, the control unit 101 erases the multiple graphics formed using different pointers without distinguishing them. In the first embodiment, the control unit 101 uses the graphic-editing unit 117 to erase the image information at the position of the pointer with which the erasing operation has been performed, from both the drawing plane of the pointer 200 and the drawing plane of the pointer 201 (update of each drawing plane).

In this manner, when the batch erase mode is set, the following operations are performed.

(a) In response to an erasing operation performed using the pointer 200, both the graphic formed using the pointer 200 and the graphic formed using the pointer 201 are erased.

(b) In response to an erasing operation performed using the pointer 201, both the graphic formed using the pointer 200 and the graphic formed using the pointer 201 are erased.

When the individual erase mode is set, the following operations are performed.

(c) In response to an erasing operation performed using the pointer 200, the graphic formed using the pointer 200 is erased, but the graphic formed using the pointer 201 is not erased.

(d) In response to an erasing operation performed using the pointer 201, the graphic formed using the pointer 201 is erased, but the graphic formed using the pointer 200 is not erased.

Figure 7A:
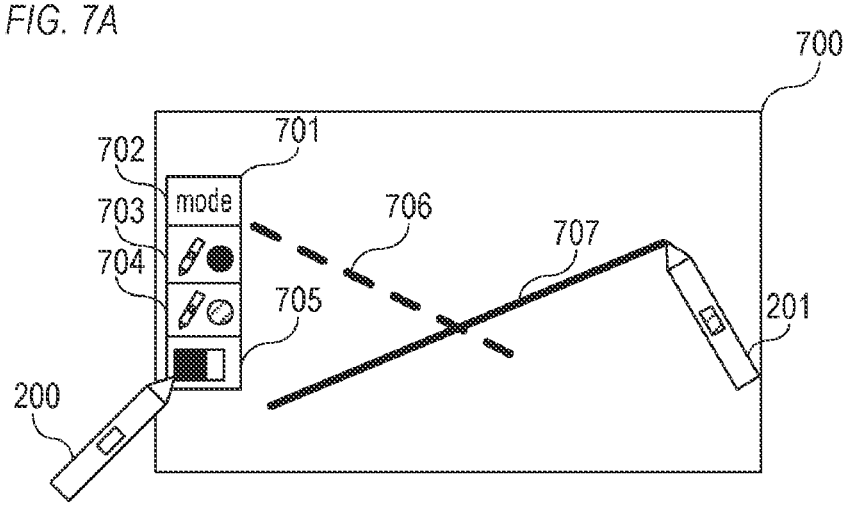
FIGS. 7A and 7B are schematic views showing display examples according to the first embodiment.
Figure 7B:
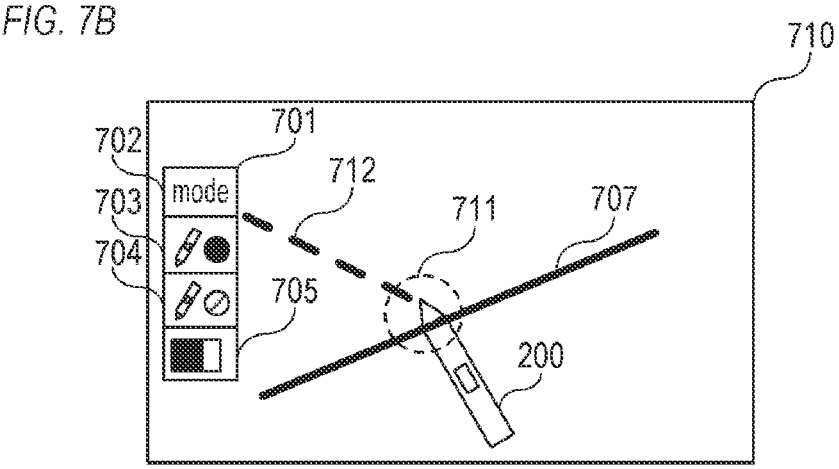

Referring to FIGS. 7A and 7B, a specific example of an operation of the projection apparatus 100 is now described. FIGS. 7A and 7B are schematic views showing display examples (projection examples) of the projection apparatus 100. An operation menu 701 is displayed on a screen 700 in FIG. 7A and a screen 710 in FIG. 7B. The operation menu 701 includes a mode-setting button 702, write buttons 703 and 704, and an erase button 705.

The mode-setting button 702 is used to set the operation mode, and the user can set the normal projection mode, the annotation mode, and the whiteboard mode by selecting the mode-setting button 702 with a pointer. As described above, the annotation mode includes the write mode, the erase mode, and the edit mode. The erase mode includes the individual erase mode and the batch erase mode. In this example, when selecting the mode-setting button 702 with a pointer, the user can set one of the individual erase mode and the batch erase mode as the erase mode. The write mode and the erase mode may be set as an operation mode common to multiple pointers. In this example, however, these modes are set individually for each pointer. The normal projection mode, the annotation mode, and the whiteboard mode are set as operation modes common to multiple pointers. The description of the edit mode is omitted, but it may be set as an operation mode common to multiple pointers or may be set for each pointer as with the write mode and the erase mode.

The write button 703 is used to set the write mode corresponding to the pointer 200. When the user selects the write button 703 with the pointer 200, the write mode of the pointer 200 is set, enabling a writing operation (graphic drawing) using the pointer 200. The user can also set the writing color and writing pattern (the color and pattern of a graphic to be drawn) of the pointer 200, for example, by selecting the write button 703 with the pointer 200. In the same manner, the write button 704 is used to set the write mode corresponding to the pointer 201.

The erase button 705 is used to set the erase mode. When the user selects the erase button 705 with a pointer, the erase mode is set as the operation mode of the pointer with which the erase button 705 is selected, enabling an erasing operation (graphic erasing) using the pointer with which the erase button 705 is selected. For example, as shown in FIG. 7A, when the user selects the erase button 705 with the pointer 200, the erase mode of the pointer 200 is set, enabling an erasing operation using the pointer 200. At this time, the operation mode of the pointer 201 is not changed. For example, when the write mode of the pointer 201 is set before the user selects the erase button 705 with the pointer 200, the write mode of the pointer 201 is maintained even after the user selects the erase button 705 with the pointer 200. This enables operations in which a graphic is erased with the pointer 200 and a graphic is written with the pointer 201.

In FIG. 7A, a graphic 706 (broken line) formed using the pointer 200 and a graphic 707 (solid line) formed using the pointer 201 are displayed, and the graphic 706 and the graphic 707 intersect. As shown in FIG. 7B, when the erase mode of the pointer 200 is set, an erasing range (range erased by an erasing operation) 711 is displayed near the tip of the pointer 200. For example, the control unit 101 displays the erasing range 711 at the position obtained using the position-detecting unit 114 and the coordinate-calculating unit 115.

When the individual erase mode of the pointer 200 is set, an erasing operation performed using the pointer 200 at the intersection of the graphics 706 and 707 erases only the graphic 706 formed using the pointer 200 in the erasing range 711, without erasing the graphic 707 formed using the pointer 201. As shown in FIG. 7B, the graphic 706 thus becomes a graphic 712 (the graphic 707 does not change). When the batch erase mode of the pointer 200 is set, an erasing operation performed using the pointer 200 at the intersection between the graphics 706 and 707 erases both of the graphics 706 and 707 in the erasing range 711.

Figure 8A:
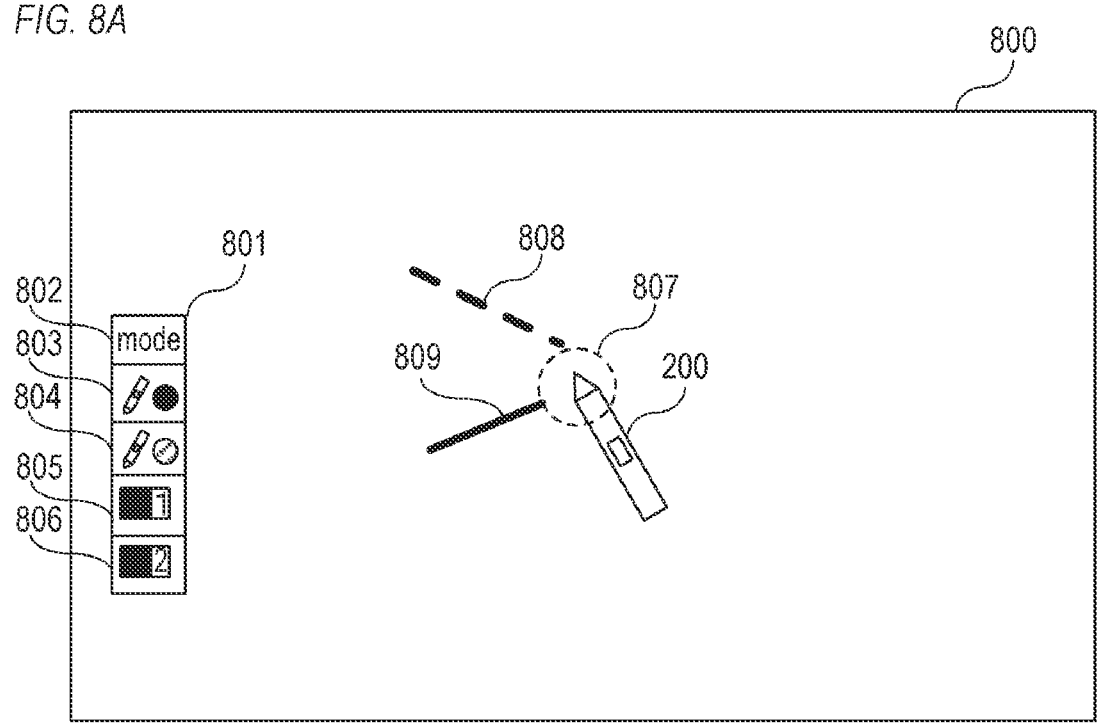
FIGS. 8A and 8B are schematic views showing display examples according to the first embodiment.
Figure 8B:
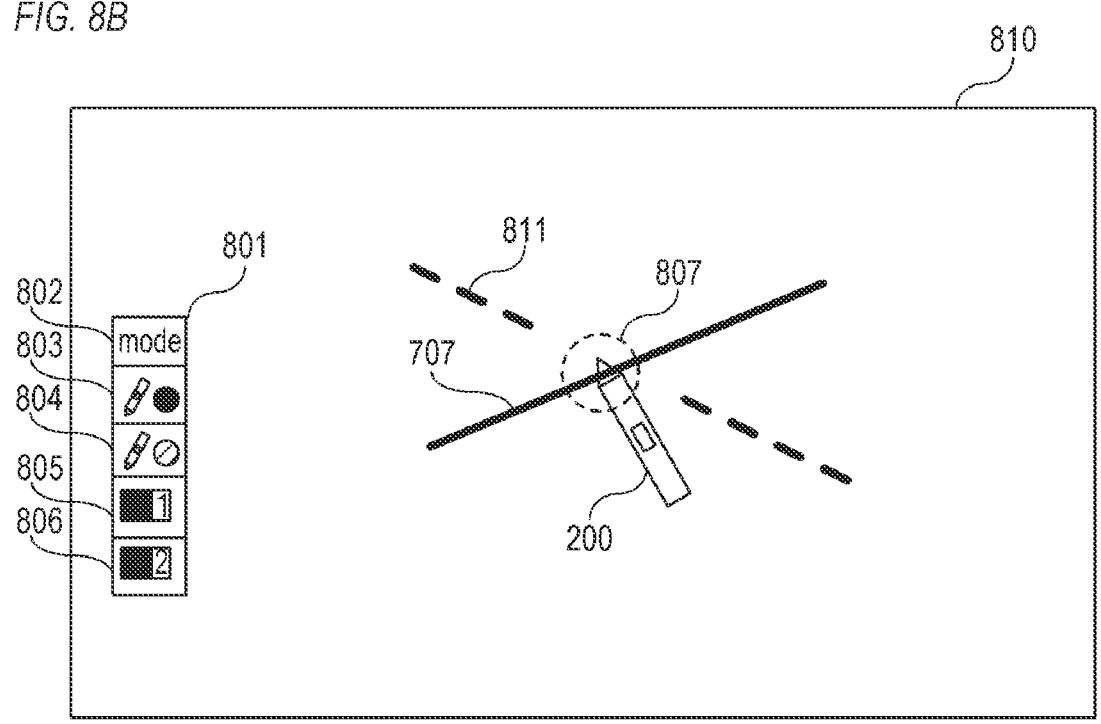

Referring to FIGS. 8A and 8B, another specific example of an operation of the projection apparatus 100 is now described. FIGS. 8A and 8B are schematic views showing display examples (projection examples) of the projection apparatus 100. An operation menu 801 is displayed on a screen 800 in FIG. 8A and a screen 810 in FIG. 8B. The operation menu 801 includes a mode-setting button 802, write buttons 803 and 804, a batch erase button 805, and an individual erase button 806.

The mode-setting button 802 is used to set the operation mode, and the user can set the normal projection mode, the annotation mode, and the whiteboard mode by selecting the mode-setting button 802 with a pointer. Unlike the mode-setting button 702 in FIGS. 7A and 7B, however, setting between the individual erase mode and the batch erase mode as the erase mode is not possible with the mode-setting button 802. The write buttons 803 and 804 are the same as the write buttons 703 and 704 of FIGS. 7A and 7B.

The batch erase button 805 is used to set the batch erase mode. When the user selects the batch erase button 805 with a pointer, the batch erase mode is set as the operation mode of the pointer with which the batch erase button 805 is selected, enabling batch erasing using the pointer with which the batch erase button 805 is selected. The individual erase button 806 is used to set the individual erase mode. When the user selects the individual erase button 806 with a pointer, the individual erase mode is set as the operation mode of the pointer with which the individual erase button 806 is selected, enabling individual erasing using the pointer with which the individual erase button 806 is selected.

In this example, prior to the display in FIGS. 8A and 8B, it is assumed that the graphic 706 (broken line) formed using the pointer 200 and the graphic 707 (solid line) formed using the pointer 201 are displayed as in FIG. 7A.

When the batch erase mode of the pointer 200 is selected, as shown in FIG. 8A, an erasing range (range erased by an erasing operation) 807 is displayed near the tip of the pointer 200. Then, when an erasing operation is performed using the pointer 200 at the intersection of the graphics 706 and 707, both the graphic 706 formed using the pointer 200 and the graphic 707 formed using the pointer 201 are erased in the erasing range 807. Thus, as shown in FIG. 8A, the graphic 706 becomes a graphic 808, and the graphic 707 becomes a graphic 809.

When the individual erase mode of the pointer 200 is set, as shown in FIG. 8B, the erasing range 807 is displayed near the tip of the pointer 200. Then, when an erasing operation is performed using the pointer 200 at the intersection of the graphics 706 and 707, only the graphic 706 formed using the pointer 200 is erased in the erasing range 807 without erasing the graphic 707 formed using the pointer 201. As shown in FIG. 8B, the graphic 706 thus becomes a graphic 811 (the graphic 707 does not change).

When operating in the individual erase mode, it is also possible to edit (erase) a graphic formed using a pointer that differs from the pointer with which the instruction (operation) is input. For example, the operation menu may be configured such that an individual erase mode can be set in which only a graphic formed using the pointer 201 is erased with the pointer 200. For example, the operation menu may include a button for setting the batch erase mode, a button for setting an individual erase mode A in which only a graphic formed using the pointer 200 is erased, and a button for setting an individual erase mode B in which only a graphic formed using the pointer 201 is erased. When the individual erase mode A is set, a graphic that is formed using the pointer 200 and corresponds to the position indicated with a pointer is erased, while a graphic that is formed using the pointer 201 and corresponds to the position indicated with the pointer is not erased. When the individual erase mode B is set, a graphic that is formed using the pointer 201 and corresponds to the position indicated with a pointer is erased, while a graphic that is formed using the pointer 200 and corresponds to the position indicated with the pointer is not erased.

As described above, in the first embodiment, a first graphic formed using a first pointer and a second graphic formed using a second pointer can be edited independently of each other. This facilitates the editing of graphics using pointers.

Second Embodiment

A second embodiment according to the present invention is now described. The differences, such as different configurations and processes, from the first embodiment are described below in detail, and the descriptions of the same features as the first embodiment are omitted as appropriate.

In the second embodiment, an example is described in which the authority to edit a graphic formed using a specific pointer is set for each pointer. This authority may be a predetermined fixed authority or an authority that can be changed according to an operation by the user or the like. With the second embodiment, it is assumed that the authority to edit both a graphic formed using the pointer 200 and a graphic formed using the pointer 201 is set as the authority of the pointer 200. Also, as the authority of the pointer 201, the authority is set to edit a graphic formed using the pointer 201 without editing a graphic formed using the pointer 200. In the second embodiment, these authorities are authorities to erase graphics (erasing authorities), but the authorities do not have to be erasing authorities. The authorities may be authorities to enlarge, reduce, or move graphics.

Figure 9:
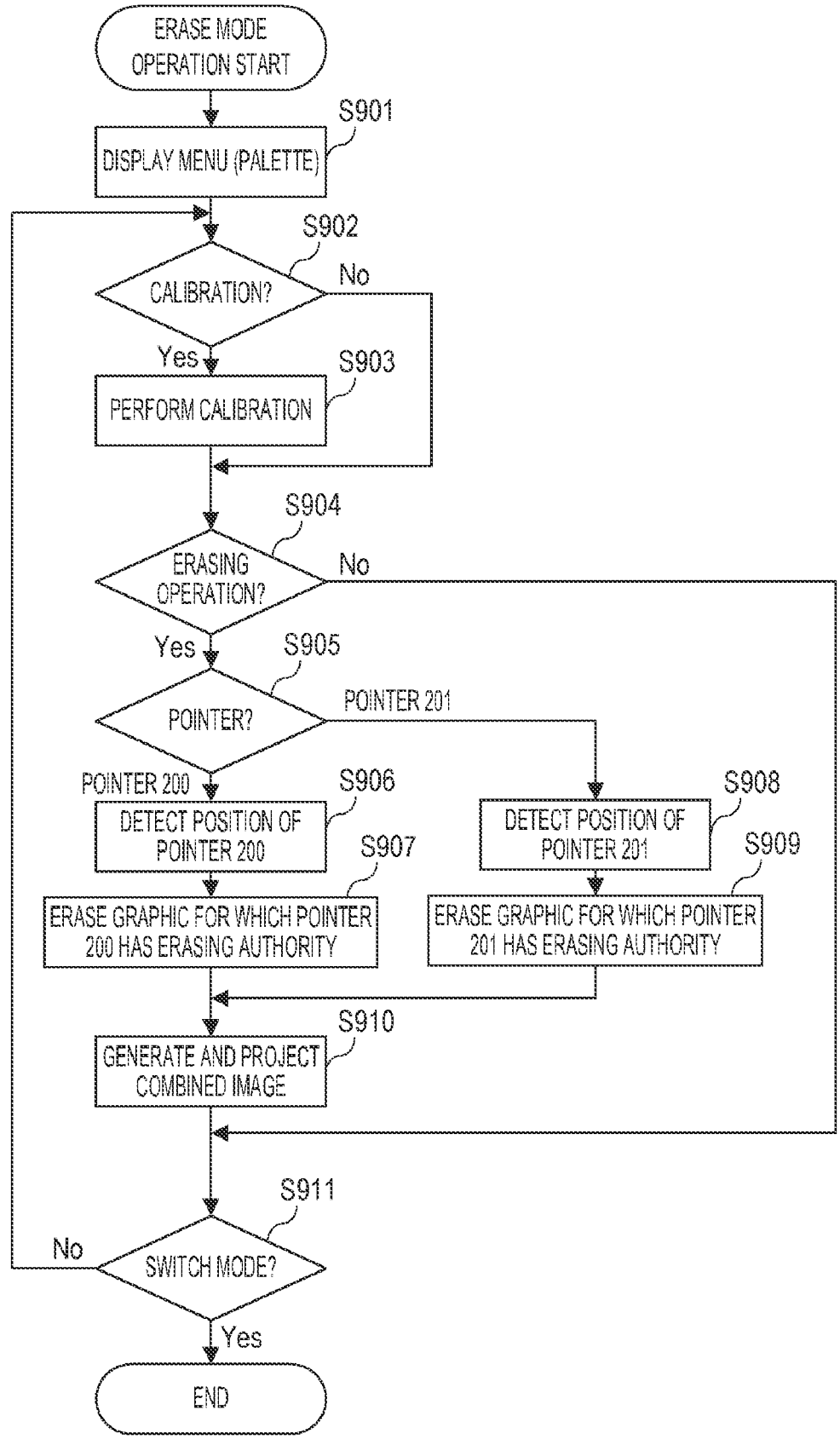
FIG. 9 is a flowchart showing an operation example of an erase mode according to a second embodiment.

FIG. 9 is a flowchart showing an example of an erase mode operation (operation of the projection apparatus 100 in a state in which the erase mode is set) according to the second embodiment.

At step S901, the control unit 101 combines and projects an input image (obtained image) and an operation menu generated by the graphic-generating unit 116.

At step S902, the control unit 101 determines whether the user has selected the calibration button in the operation menu. If the control unit 101 determines that the calibration button is selected, the process proceeds to step S903. If not, the process proceeds to step S904.

At step S903, the control unit 101 performs calibration of the coordinate-calculating unit 115 (calibration of the coordinate transformation by the coordinate-calculating unit 115).

At step S904, the control unit 101 determines whether an operation (erasing operation) is performed using a pointer. If the control unit 101 determines that an erasing operation is performed, the process proceeds to step S905. If not, the process proceeds to S911.

At step S905, the control unit 101 determines from the identification result of the pointer-identifying unit 113 whether the pointer with which the erasing operation is performed is the pointer 200 or the pointer 201. The control unit 101 proceeds to step S906 when determining that the pointer with which the erasing operation is performed is the pointer 200, or proceeds to step S908 when determining that the pointer with which the erasing operation is performed is the pointer 201.

At step S906, the control unit 101 uses the position-detecting unit 114 and the coordinate-calculating unit 115 to obtain the position of the pointer 200 in the projection image.

At step S907, according to the erasing operation performed using the pointer 200, the control unit 101 erases the graphic for which the pointer 200 has the erasing authority. In the second embodiment, the control unit 101 uses the graphic-editing unit 117 to erase the image information at the position of the pointer 200 from the drawing plane of the graphics for which the pointer 200 has the erasing authority. As described above, in the second embodiment, the authority to erase both a graphic formed using the pointer 200 and a graphic formed using the pointer 201 is set as the erasing authority of the pointer 200. Thus, the control unit 101 erases the image information at the position of the pointer 200 from the drawing plane of the pointer 200 and the drawing plane of the pointer 201 (update of the drawing planes of the pointers 200 and 201).

At step S908, the control unit 101 uses the position-detecting unit 114 and the coordinate-calculating unit 115 to obtain the position of the pointer 201 in the projection image.

At step S909, according to the erasing operation performed using the pointer 201, the control unit 101 erases the graphic for which the pointer 201 has the erasing authority. In the second embodiment, the control unit 101 uses the graphic-editing unit 117 to erase the image information at the position of the pointer 201 from the drawing plane of the graphics for which the pointer 201 has the erasing authority. As described above, in the second embodiment, the authority to erase a graphic formed using the pointer 201 without erasing a graphic formed using the pointer 200 is set as the erasing authority of the pointer 201. Thus, the control unit 101 does not erase the image information from the drawing plane of the pointer 200 and erases the image information at the position of the pointer 201 only from the drawing plane of the pointer 201 (update of the drawing plane of the pointer 201).

At step S910, the control unit 101 uses the image-combining unit 123 to combine the input image (obtained image) with the drawing planes (drawing planes updated according to the erasing operation). The control unit 101 projects the combined image onto the projection surface (update of the projection image). The projection of the combined image may involve processing by the image-correcting unit 124, processing by the projection-controlling unit 125, and the like.

At step S911, the control unit 101 determines whether an operation for switching the operation mode of the projection apparatus 100 is performed by the user. If the control unit 101 determines that an operation for switching the operation mode of the projection apparatus 100 is performed, the control unit 101 ends the process shown in FIG. 9. If not, the process returns to step S902.

Figure 10A:
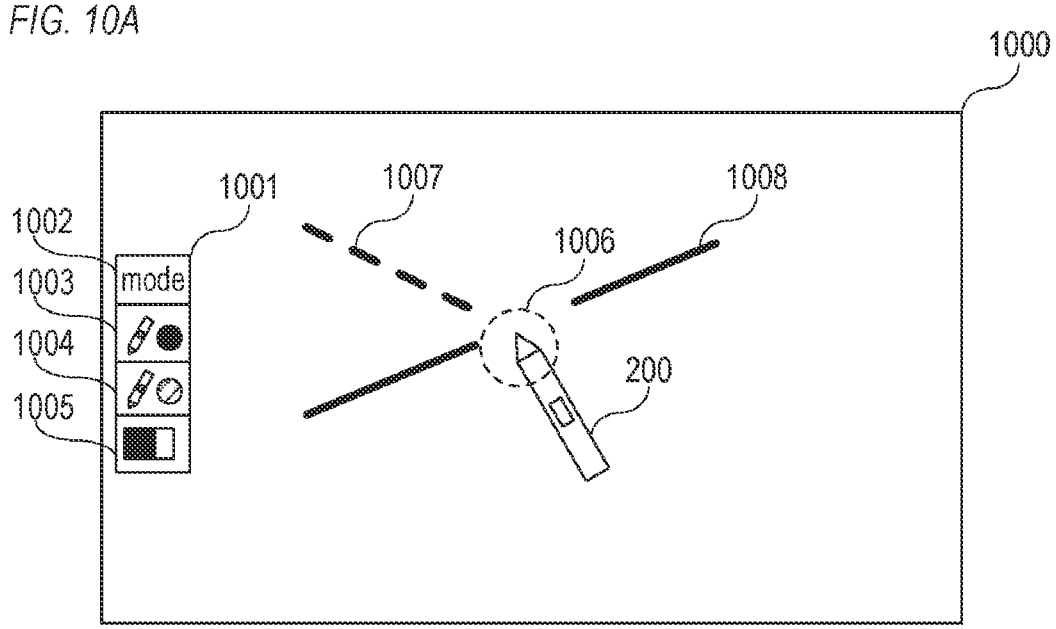
FIGS. 10A and 10B are schematic views showing display examples according to the second embodiment.
Figure 10B:
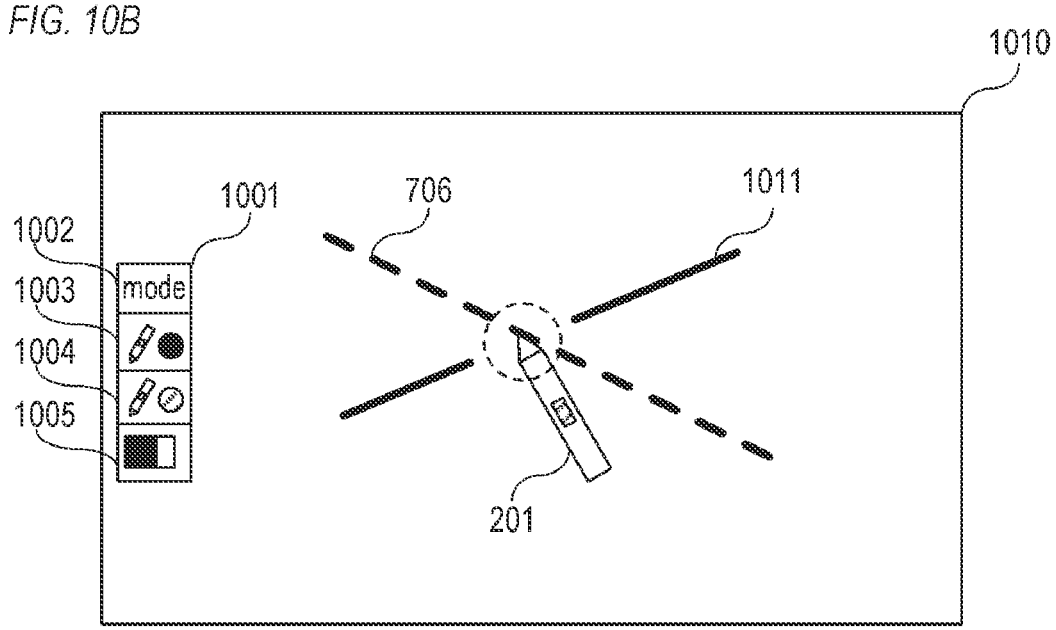

Referring to FIGS. 10A and 10B, a specific example of an operation of the projection apparatus 100 according to the second embodiment is now described. FIGS. 10A and 10B are schematic views showing display examples (projection examples) of the projection apparatus 100. An operation menu 1001 is displayed on a screen 1000 in FIG. 10A and a screen 1010 in FIG. 10B. The operation menu 1001 includes a mode-setting button 1002, write buttons 1003 and 1004, and an erase button 1005.

The mode-setting button 1002 is the same as the mode-setting button 802 of FIGS. 8A and 8B. The write buttons 1003 and 1004 are the same as the write buttons 803 and 804 of FIGS. 8A and 8B.

The erase button 1005 is used to set the erase mode. When the user selects the erase button 1005 with a pointer, the erase mode is set as the operation mode of the pointer with which the erase button 1005 is selected, enabling an erasing operation with the pointer with which the erase button 1005 is selected. When an erasing operation is performed using the pointer, the graphics for which this pointer has the erasing authority are erased.

In this example, prior to the display in FIGS. 10A and 10B, it is assumed that the graphic 706 (broken line) formed using the pointer 200 and the graphic 707 (solid line) formed using the pointer 201 are displayed as in FIG. 7A.

When the erase mode of the pointer 200 is set, as shown in FIG. 10A, an erasing range (range erased by an erasing operation) 1006 is displayed near the tip of the pointer 200. Then, when an erasing operation is performed using the pointer 200 at the intersection of the graphics 706 and 707, the graphics for which the pointer 200 has the erasing authority are erased in the erasing range 1006. Since the authority to erase all graphics is set as the erasing authority of the pointer 200, both the graphic 706 formed using the pointer 200 and the graphic 707 formed using the pointer 201 are erased in the erasing range 1006. Thus, as shown in FIG. 10A, the graphic 706 becomes a graphic 1007, and the graphic 707 becomes a graphic 1008.

When the erase mode of the pointer 201 is set, as shown in FIG. 10B, the erasing range 1006 is displayed near the tip of the pointer 201. Then, when an erasing operation is performed using the pointer 201 at the intersection of the graphics 706 and 707, the graphics for which the pointer 201 has the erasing authority are erased in the erasing range 1006. Since the authority to only erase graphics formed using the pointer 201 is set as the erasing authority of the pointer 201, only the graphic 707 formed using the pointer 201 is erased in the erasing range 1006 without erasing the graphic 706 formed using the pointer 200. As a result, as shown in FIG. 10B, the graphic 707 becomes a graphic 1011 (the graphic 706 does not change).

As described above, in the second embodiment, the authority to edit graphics formed using a specific pointer is set for each pointer. It is thus possible to edit only the graphics for which a pointer has the authority to edit, facilitating the editing of the graphics using the pointer.

Third Embodiment

A third embodiment according to the present invention is now described. The differences, such as different configurations and processes, from the first embodiment are described below in detail, and the descriptions of the same features as the first embodiment are omitted as appropriate. In the first and second embodiments, examples of erasing of graphics are described. In the third embodiment, examples of editing, specifically, enlarging, reducing, and moving of graphics are described.

Figure 11:
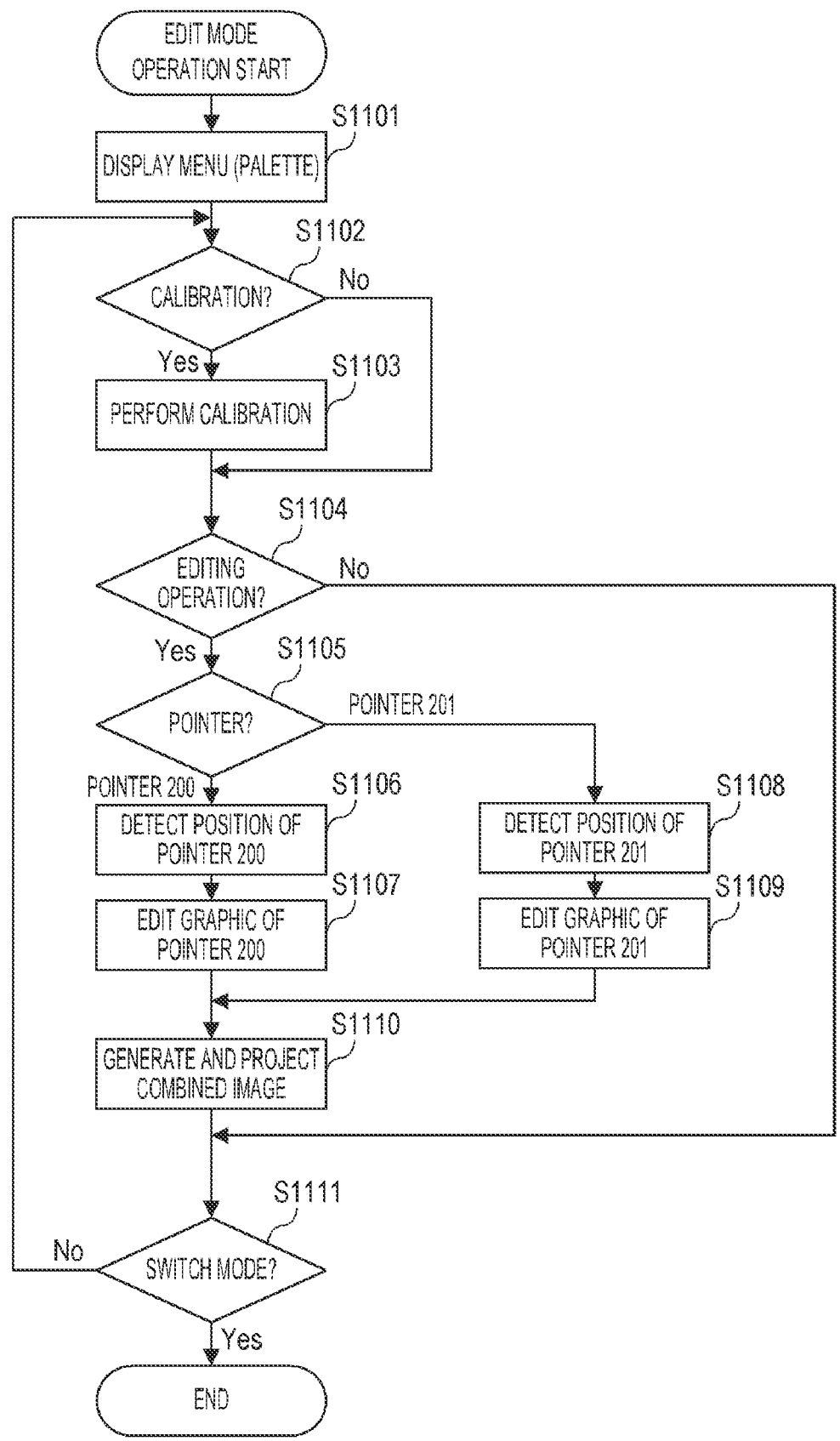
FIG. 11 is a flowchart showing an operation example of an edit mode according to a third embodiment.

FIG. 11 is a flowchart showing an operation example of the projection apparatus 100 in a state in which the edit mode is set.

At step S1101, the control unit 101 combines and projects an input image (obtained image) and an operation menu generated by the graphic-generating unit 116.

At step S1102, the control unit 101 determines whether the user has selected the calibration button in the operation menu. When determining that the calibration button is selected, the control unit 101 proceeds to step S1103. If not, the process proceeds to step S1104.

At step S1103, the control unit 101 performs calibration of the coordinate-calculating unit 115 (calibration of the coordinate transformation by the coordinate-calculating unit 115).

At step S1104, the control unit 101 determines whether an operation (editing operation) is performed using a pointer. In the third embodiment, the control unit 101 determines that an editing operation is performed when the pointer-identifying unit 113 detects the pointer 200 or the pointer 201. If not, the control unit 101 determines that an editing operation is not performed. If the control unit 101 determines that an editing operation is performed, the process proceeds to step S1105. If not, the process proceeds to S1111.

At step S1105, the control unit 101 determines from the identification result of the pointer-identifying unit 113 whether the pointer with which the editing operation is performed is the pointer 200 or the pointer 201. The control unit 101 proceeds to step S1106 when determining that the pointer with which the editing operation is performed is the pointer 200, or proceeds to step S1108 when determining that the pointer with which the editing operation is performed is the pointer 201.

At step S1106, the control unit 101 uses position-detecting unit 114 and the coordinate-calculating unit 115 to obtain the position of the pointer 200 in the projection image.

At step S1107, the control unit 101 edits the graphic formed using the pointer 200 according to the editing operation performed using the pointer 200. In the third embodiment, the control unit 101 uses the graphic-editing unit 117 to edit (enlarge, reduce, or move) the graphic drawn on the drawing plane of the pointer 200 according to the movement of the pointer 200 (update of the drawing plane of the pointer 200).

At step S1108, the control unit 101 uses position-detecting unit 114 and the coordinate-calculating unit 115 to obtain the position of the pointer 201 in the projection image.

At step S1109, the control unit 101 edits the graphic formed using the pointer 201 according to the editing operation performed using the pointer 201. In the third embodiment, the control unit 101 uses the graphic-editing unit 117 to edit (enlarge, reduce, or move) the graphic drawn on the drawing plane of the pointer 201 according to the movement of the pointer 200 (update of the drawing plane of the pointer 201).

At step S1110, the control unit 101 uses the image-combining unit 123 to combine the input image (obtained image) with the drawing planes (drawing planes updated according to the editing operation). The control unit 101 projects the combined image onto the projection surface (update of the projection image). The projection of the combined image may involve processing by the image-correcting unit 124, processing by the projection-controlling unit 125, and the like.

At step S1111, the control unit 101 determines whether an operation for switching the operation mode of the projection apparatus 100 is performed by the user. If the control unit 101 determines that an operation for switching the operation mode of the projection apparatus 100 is performed, the control unit 101 ends the process shown in FIG. 11. If not, the process returns to step S1002.

Figure 12A:
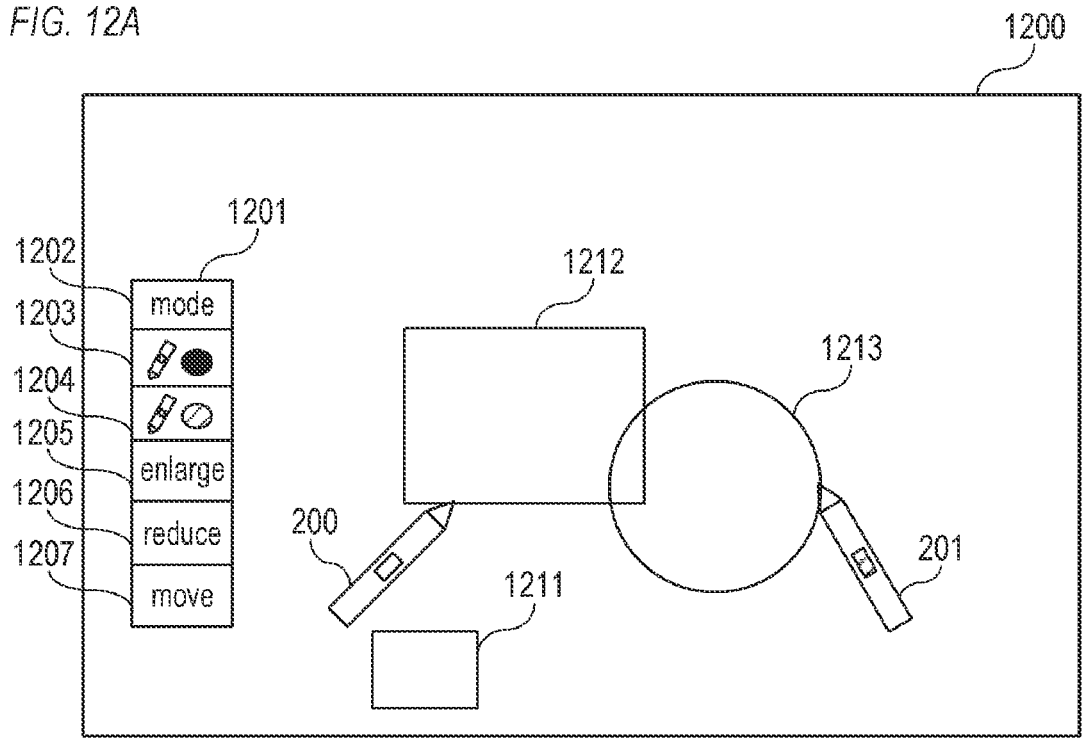
FIGS. 12A and 12B are schematic views showing display examples according to the third embodiment.
Figure 12B:
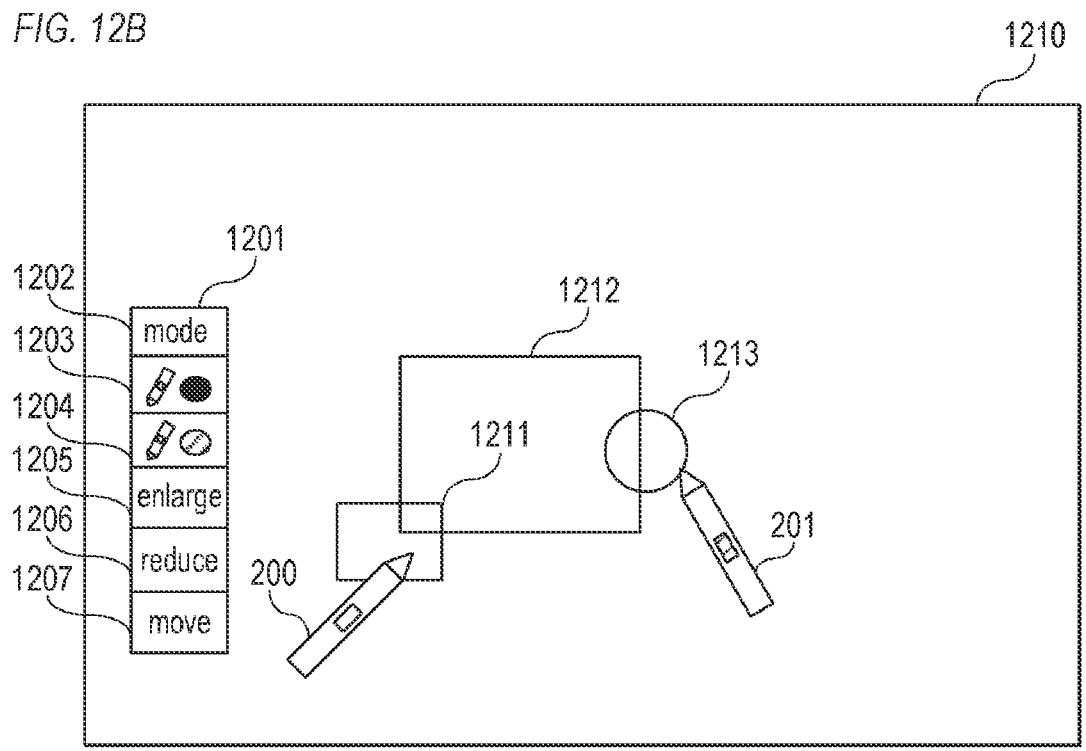

Referring to FIGS. 12A and 12B, a specific example of an operation of the projection apparatus 100 according to the third embodiment is now described. FIGS. 12A and 12B are schematic views showing display examples (projection examples) of the projection apparatus 100. An operation menu 1201 is displayed on a screen 1200 in FIG. 12A and a screen 1210 in FIG. 12B. The operation menu 1201 includes a mode-setting button 1202, a write button 1203, 1204, an enlarge button 1205, a reduce button 1206, and a move button 1207.

The mode-setting button 1202 is the same as the mode-setting button 1002 of the second embodiment (FIGS. 10A and 10B). The write buttons 1203 and 1204 are the same as the write buttons 1003 and 1004 of the second embodiment.

The enlarge button 1205 is used to enlarge a graphic, the reduce button 1206 is used to reduce the size of a graphic, and the move button 1207 is used to move a graphic. When the user selects one of the enlarge button 1205, the reduce button 1206, and the move button 1207 with a pointer, the edit mode is set as the operation mode of this pointer, enabling an editing operation using this pointer. Selecting the enlarge button 1205 enables an enlarging operation for enlarging a graphic, and selecting the reduce button 1206 enables a reducing operation for reducing the size of a graphic. Selecting the move button 1207 enables a moving operation for moving a graphic.

FIG. 12A shows the screen 1200 before editing. On the screen 1200, graphics 1211 and 1212 formed using the pointer 200 and a graphic 1213 formed using the pointer 201 are displayed. Here, each graphic is drawn on a drawing plane of each pointer in a format that can be edited independently. For example, as the drawing planes of the pointer 200, a drawing plane on which the graphic 1211 is drawn and a drawing plane on which the graphic 1212 is drawn are separately prepared.

FIG. 12B shows the screen 1210 after editing. In FIG. 12B, the graphic 1211 has been moved from the position in FIG. 12A because the user has selected the move button 1207 with the pointer 200, selected the graphic 1211 with the pointer 200, and moved the position selected with the pointer 200. At this time, the position and shape of the graphic 1213 formed using the pointer 201 do not change. Additionally, the size of the graphic 1213 has been reduced from the state shown in FIG. 12A because the user has selected the reduction button 1206 with the pointer 201, selected the graphic 1213 with the pointer 201, and moved the position selected with the pointer 201. At this time, the positions and shapes of the graphics 1211 and 1212 formed using the pointer 200 do not change. As described above, in an editing operation performed using the pointer 200, the graphics 1211 and 1212 formed using the pointer 200 can be edited while maintaining the position and shape of the graphic 1213 formed using the pointer 201. Likewise, in an editing operation performed using the pointer 201, the graphic 1213 formed using the pointer 201 can be edited while maintaining the positions and shapes of the graphics 1211 and 1212 formed using the pointer 200.

As described above, in the third embodiment, a first graphic formed using a first pointer and a second graphic formed using a second pointer can be edited (specifically, enlarged, reduced, and moved) independently of each other. This facilitates the editing of graphics using pointers.

The above-described embodiments (including modifications) are merely examples, and the present invention also includes configurations obtained by appropriately modifying or changing the above-described configurations within the scope of the present invention. The present invention also includes configurations obtained by appropriately combining the above-described configurations. For example, the above embodiments use two pointers, but three or more pointers may be used.

The present disclosure facilitates the editing of graphics using pointers.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-209675, filed on Dec. 17, 2020, which is hereby incorporated by reference herein in its entirety.

What is claimed is:

1. A projection apparatus comprising
at least one memory and at least one processor which function as:
a control unit configured to control to project an image on a projection surface;
a detection unit configured to detect an operation performed on the projection surface using a pointer; and
a processing unit configured to perform generation and editing of a graphic in response to the operation,
wherein the processing unit is able to edit a first graphic formed using a first pointer and a second graphic formed using a second pointer independently of each other, and is able to edit both the first graphic and the second graphic in response to an operation performed using the second pointer.

2. The projection apparatus according to claim 1, wherein the processing unit is able to, in response to an operation performed using the first pointer, edit the first graphic without editing the second graphic.

3. The projection apparatus according to claim 1, wherein the control unit controls to project an input image, the first graphic, and the second graphic together on the projection surface.

4. The projection apparatus according to claim 1, wherein the projection apparatus has modes including a first mode in which the first graphic and the second graphic are to be edited, and a second mode in which only one of the first graphic and the second graphic is to be edited.

5. The projection apparatus according to claim 4, wherein the at least one memory and the at least one processor further function as a setting unit configured to set one of a plurality of operation modes including the first mode and the second mode, the control unit controls to project a user interface image for setting the operation mode on the projection surface, and the setting unit sets the operation mode in response to an operation performed on the user interface image using the pointer.

6. The projection apparatus according to claim 4, wherein in a case where the first mode is set, the processing unit edits both the first graphic and the second graphic in response to an operation performed using the first pointer, and edits both the first graphic and the second graphic in response to an operation performed using the second pointer, and in a case where the second mode is set, the processing unit edits the first graphic without editing the second graphic in response to an operation performed using the first pointer, and edits the second graphic without editing the first graphic in response to an operation performed using the second pointer.

7. The projection apparatus according to claim 1, wherein an authority to edit a graphic formed using a specific pointer is set for each pointer.

8. The projection apparatus according to claim 7, wherein the processing unit edits the first graphic without editing the second graphic in response to an operation performed using the first pointer, and edits both the first graphic and the second graphic in response to an operation performed using the second pointer.

9. The projection apparatus according to claim 7, wherein the authority is changeable.

10. The projection apparatus according to claim 1, wherein the editing of a graphic is erasing of the graphic and processing to erase the graphic corresponding to a position of the pointer with which the operation is input.

11. The projection apparatus according to claim 1, wherein the editing of a graphic is changing of a size of the graphic and processing to change the size of the graphic corresponding to a position of the pointer with which the operation is input.

12. The projection apparatus according to claim 1, wherein the editing of a graphic is moving of the graphic and processing to move the graphic corresponding to a position of the pointer with which the operation is input.

13. A projection method comprising:

projecting an image on a projection surface;

detecting an operation performed on the projection surface using a pointer; and performing generation and editing of a graphic in response to the operation, wherein it is able to edit a first graphic formed using a first pointer and a second graphic formed using a second pointer independently of each other, and both the first graphic and the second graphic are edited in response to an operation performed using the second pointer.

14. A non-transitory computer readable medium that stores a program, wherein the program causes a computer to execute a projection method comprising:

projecting an image on a projection surface;

detecting an operation performed on the projection surface using a pointer; and performing generation and editing of a graphic in response to the operation, wherein it is able to edit a first graphic formed using a first pointer and a second graphic formed using a second pointer independently of each other, and both the first graphic and the second graphic are edited in response to an operation performed using the second pointer.

* * * * *